United States Patent [19]
Furuta

[11] Patent Number: 5,999,512
[45] Date of Patent: Dec. 7, 1999

[54] MAGNETOOPTICAL DISK HAVING A THERMAL DIFFUSION LAYER TO SUPPRESS THERMAL TRANSMISSION BETWEEN ADJACENT INFORMATION TRACKS

[75] Inventor: Masahiro Furuta, Tokyo, Japan

[73] Assignee: Nikon Corporation, Tokyo, Japan

[21] Appl. No.: 09/055,353

[22] Filed: Apr. 6, 1998

[30] Foreign Application Priority Data

Apr. 9, 1997 [JP] Japan ................................ 9-090953

[51] Int. Cl.$^6$ ........................................... G11B 11/10
[52] U.S. Cl. ............ 369/275.1; 369/13; 369/275.2; 369/288; 428/64.4; 428/694 EC; 428/694 ML
[58] Field of Search ..................... 369/13, 275.1, 369/275.4, 275.2, 288; 428/694 MM, 913, 694 EC, 694 ML, 900, 64.4, 689, 697, 64.3

[56] References Cited

U.S. PATENT DOCUMENTS

| | | | |
|---|---|---|---|
| 5,118,541 | 6/1992 | Yamamoto et al. | 428/64.8 |
| 5,309,427 | 5/1994 | Matsumoto | 369/275.2 |
| 5,635,267 | 6/1997 | Yamada et al. | 428/64.4 |
| 5,654,058 | 8/1997 | Kirino et al. | 428/64.3 |
| 5,821,004 | 10/1998 | Hino et al. | 428/694 |

*Primary Examiner*—John W. Cabeca
*Assistant Examiner*—Kim-Kwok Chu

[57] ABSTRACT

A magnetooptical disk includes a thermal diffusion layer to suppress thermal transmission between adjacent information tracks. The information tracks are formed within the magnetooptical disk along respective land portions or groove portions having a difference in grade. During recording and erasing of the magnetooptical disk, the land portions and groove portions may be changed with identical power levels. The thermal diffusion layer diffuses heat generated by irradiation of a laser beam. A protective layer is formed over the thermal diffusion layer and a recording layer which records various bits of information is formed over the protective layer.

22 Claims, 5 Drawing Sheets

MAGNETOOPTICAL DISK HAVING A THERMAL DIFFUSION LAYER TO SUPPRESS THERMAL TRANSMISSION BETWEEN ADJACENT INFORMATION TRACKS

CROSS-REFERENCE TO RELATED APPLICATIONS

This application is based upon and claims priority of Japanese Patent Application No. 09-090953 filed Apr. 9, 1997, the contents being incorporated herein by reference.

BACKGROUND OF THE INVENTION

The present invention relates to the field of magnetooptical recording systems and media. More particularly, the present invention relates to magnetooptical systems using magnetooptical disks on which data is recorded in both land portions and groove portions.

Generally, overwritable magnetooptical disks use a phase variable film or photomagnetic film as a recording layer. A laser beam is then focused to a spot on the magnetooptical disk and information is recorded and/or played back with the laser beam.

A recording method for this type of magnetooptical disk has achieved a higher density by recording information in both land and groove portions of the disk while shortening a wavelength of an incident laser beam. This type of recording method is generally referred to as a land and groove recording method.

In the land and groove recording method, recording density in a direction of track width is much higher compared to conventional magnetooptical disks which allow either land only, or groove only, recording.

Consequently, in the land and groove recording method, information that has been recorded in adjacent land or groove portions may inadvertently be erased when recording or erasing information. This is known as "cross erase."

One factor which contributes to cross erase is thermal conductivity. Accordingly, to reduce thermal conductivity between adjacent tracks, an optical disk may be provided with an increased difference in grade between land portions and groove portions. Thermal conductivity may also be reduced between adjacent tracks by creating a deeper groove in order to increase a thermal distance between adjacent grooves.

Nevertheless, conventional magnetooptical disks still have a problem in that an increased degree of complexity is required to control recording and playback power due to the increased difference in grade between the land portions and the groove portions.

Figure 7A:
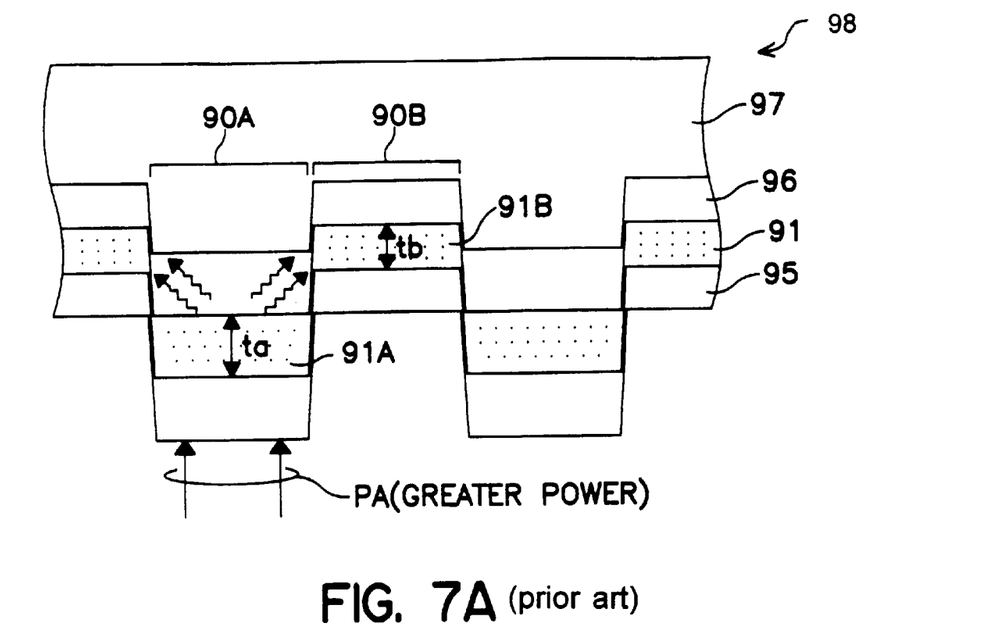
FIGS. 7A (prior art) and 7B (prior art) are cross-sectional views of a conventional magnetooptical disk in the form of a phase variable magnetooptical disk.

FIGS. 7A (prior art) and 7B (prior art) are respective cross-sectional views of a conventional magnetooptical disk 98. FIG. 7A particularly illustrates recording of information in a land portion while FIG. 7B particularly illustrates recording of information in a groove portion. A deep grade difference is formed between land portion 90A (a convex portion) and groove portion 90B (a concave portion). As illustrated, reference numeral 91 represents a magnetic layer, reference numerals 95 and 96 represent protective layers, and reference numeral 97 represents a glass base.

Figure 7B:
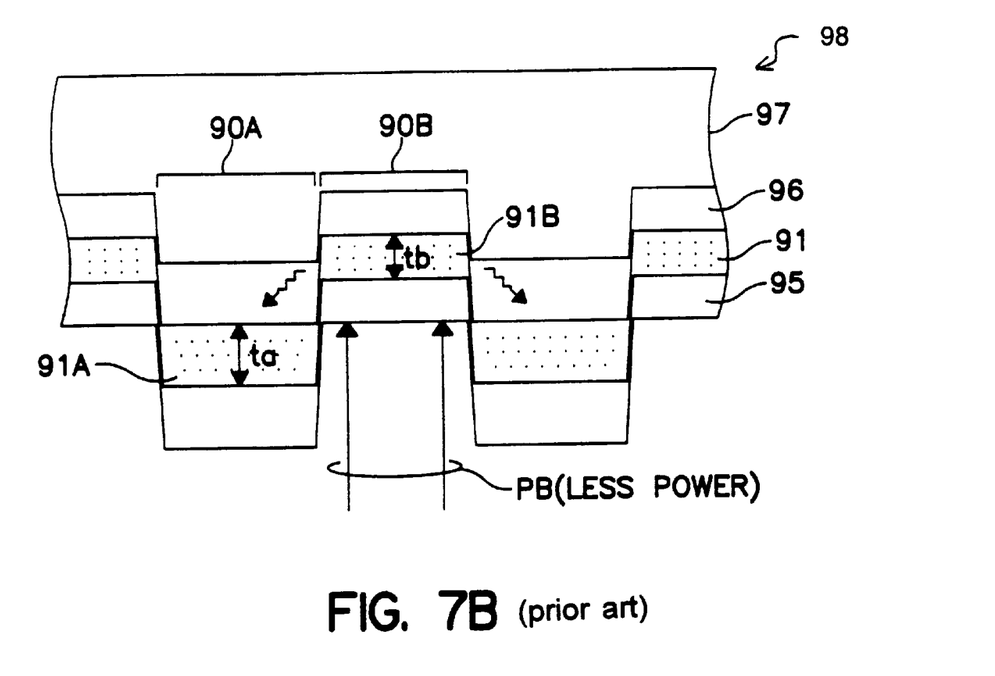

Normally, each layer of the magnetooptical disk is formed through a film forming method such as sputtering, thereby resulting in a different film thickness in each layer of land portion 90A and groove portion 90B. This phenomenon is known as shadowing, wherein film thickness tb of recording layer 91B in groove portion 90B becomes less than film thickness ta of recording layer 91A on land portion 90A (e.g., approximately 60% of recording layer 91A) during film formation. In other words, groove portion 90B is in the shadow of land portion 90A.

As a result of shadowing, the recording and erasing powers are different in land portion 90A and groove portion 90B due to this difference in film thickness, i.e. ta>tb.

For example, recording is executed with a lower recording power PB in groove portion 90B (having a thinner film thickness), whereas a higher recording power PA (PA>PB) is required for recording in land portion 90A (having a greater film thickness).

In this case, at least two types of recording and erasing powers are required for communicating with each respective land portion and groove portion, thereby resulting in a more complicated configuration and more complex control for the device, as well as an associated increase in cost.

As illustrated in FIG. 7B, when erasing or recording information in groove portion 90B, recording layer 91A is not easily heated because film thickness ta of recording layer 91A is thicker than film thickness tb of recording layer 91B. Recording layer 91A has a greater thermal mass thereby reducing a potential for unintended erasure of information.

On the other hand, as illustrated in FIG. 7A (prior art), when erasing or recording information in land portion 90A, recording layer 91B is easily heated because film thickness tb of recording layer 91B is tin in comparison with film thickness ta of recording layer 91A. Recording layer 91B therefore has a smaller thermal mass which occasionally allows information in recording layer 91B to be erased due to heat from adjacent recording layer 91A. In this case, the use of a deep groove as a cross-erase prevention measure is ineffective.

BRIEF SUMMARY OF THE INVENTION

It is therefore an object of the present invention to solve the above-mentioned problems by providing a magnetooptical disk that is capable of recording and erasing information in both land and groove portions with the same amount of power.

It is another object of the present invention to provide a magnetooptical disk having a thermal diffusion layer formed on a base with both convex and concave portions configured in a concentric circle, or a spiral shape, for the purpose of tracking.

It is a further object of the present invention to provide a magnetooptical disk that diffuses generated heat due to irradiation by a laser beam by way of a protective layer.

It is a further object of the present invention to provide a thermal diffusion layer on a convex portion of a magnetooptical disk in a vicinity of a recording layer having a relatively thin film thickness and located at a higher position than a thermal diffusion layer formed on a concave portion.

Objects of the present invention are achieved by a magnetooptical disk, including a base; a thermal diffusion layer formed on the base having both convex and concave portions arranged in a concentric circle or a spiral shape for tracking, the thermal diffusion layer to diffuse heat generated through irradiation by a laser beam; a protective layer formed on the thermal diffusion layer; and a recording layer formed over the protective layer to record information.

Further objects of the present invention are achieved by a magnetooptical disk having both convex and concave portions formed about a concentric circle, or a spiral shape, for of tracking, including a first recording layer formed in a concave portion to record information; a second recording layer formed in a convex portion to record information; and a thermal diffusion layer in the convex portion and being formed beneath the first recording layer in a thickness direction of the magnetooptical disk and adjacent to the second recording layer in a radial direction of the magnetooptical disk, to diffuse heat generated in the first recording layer.

Even further objects of the present invention are achieved by an optical disk, including a base; a function layer formed on the base having both convex and concave portions configured in a concentric circle or a spiral shape; a protective layer formed over the function layer; and a recording layer formed over the protective layer, wherein a thermal conductivity of the function layer, the protective layer, and the recording layer respectively increase in an order of the function layer, the protective layer, and the recording layer.

BRIEF DESCRIPTION OF THE DRAWINGS

These and other objects and advantages of the present invention will become apparent and more readily appreciated from the following description of the preferred embodiments, taken in conjunction with the accompanying drawings of which.

DETAILED DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

Figure 1A:
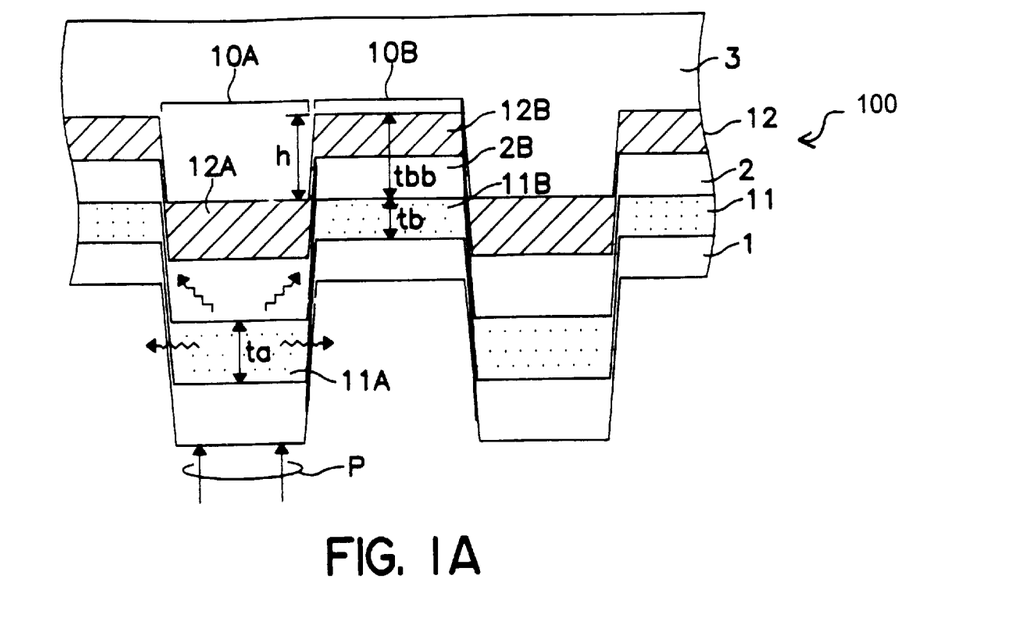
FIGS. 1A and 1B are cross-sectional views of a magnetooptical disk in the form of a phase variable magnetooptical disk according to a first preferred embodiment of the present invention.
Figure 1B:
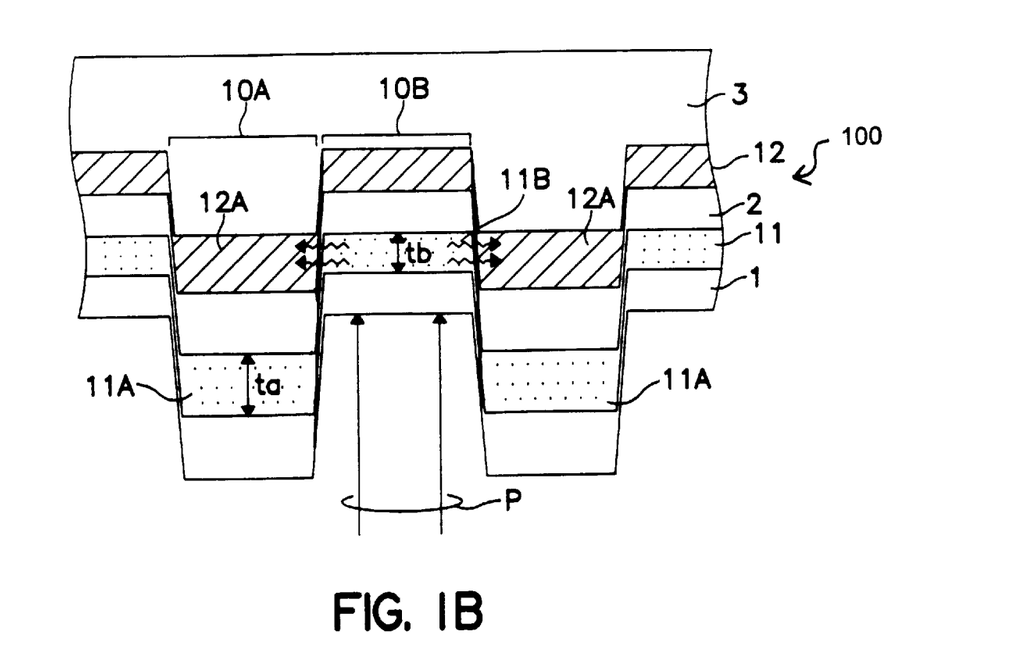

FIGS. 1A and 1B are respective cross-sectional views of a magnetooptical disk 100 according to a first preferred embodiment of the present invention. In particular, FIG. 1A is a cross-sectional view of magnetooptical disk 100 during recording or erasing of information in land portion 10A and FIG. 1B is a cross-sectional view of a magnetooptical disk 100 during recording or erasing of information in groove portion 10B.

According to the first preferred embodiment of the present invention, an explanation is provided for a phase variable type of magnetooptical disk in which information is recordable in both land and groove portions that use a phase variable film as a recording layer.

In FIGS. 1A and 1B, magnetooptical disk 100 includes a base 3 which is circular and which includes convexities and concavities arranged in a concentric circle or a spiral shape for the purpose of tracking.

The width of land portion (convex portion) 10A and groove portion (concave portion) 10B are approximately 0.7 $\mu$m each. The depth h of groove portion 10B, that is, the height difference in a thickness direction of magnetooptical disk 100 at land portion 10A and groove portion 10B is approximately 175 nm (in practice, "h" varies between 80–600 nm).

On top of base 3, thermal diffusion layer 12, which is created by adding an impurity to Aluminum (Al) is formed at groove portion 10B and maintains a thickness of approximately 100 nm. In the present invention, an impurity such as Tungsten (W) or Titanium (Ti) is preferably added to Al to form thermal diffusion layer 12. According to another embodiment of the present invention, Al may be used alone. The amount of W or Ti to be added to Al is preferably in the neighborhood of 3–5 atm %. One of the principal reasons to add W or Ti to Al is to improve the film forming condition of the thermal diffusion layer. By adding these materials a degree of thermal diffusion may be controlled. The thermal diffusion layer of the present invention exhibits a property in which a coefficient of thermal conductivity is greater than a recording layer or the protective layer. In this regard, other materials may be used to form a layer of film as long as the material has this property.

On top of thermal diffusion layer 12, a bottom protection layer 2 is formed at groove portion 10B and maintains a thickness of approximately 75 nm. Bottom protection layer 2 is preferably made from of $ZnS;SiO_2$.

Then, on top of bottom protection layer 2, a recording layer 11 is formed at groove portion 10B and maintains a thickness of approximately 80 nm (in practice, recording layer 11 varies between 50–150 nm). Recording layer 11 is preferably a phase variable film such as $Ge_2Sb_2Te_5$.

Recording layer 11B in groove portion 10B and thermal diffusion layer 12A in land portion 10A should preferably be formed at locations of approximately the same height in a thickness direction of magnetooptical disk 100.

Furthermore, on top of recording layer 11, a top protection layer 1, preferably made of $ZnS;SiO_2$, is formed at groove portion 10B and maintains a film thickness of approximately 100 nm (in practice, top protection layer 1 varies between 50–150 nm). Thus, as illustrated, each successive layer follows the contour of original land portion 10A and groove portion 10B in base 3, and recording layer 11 is formed adjacent to thermal diffusion layer 12 in a radial direction of disk 100 (i.e. in a horizontal direction of FIGS. 1A and 1B).

Next, with reference to FIGS. 1A and 1B, an explanation is provided regarding recording and erasing operations for a phase variable magnetooptical disk 100 according to the first preferred embodiment of the present invention.

To record or playback information on phase variable magnetooptical disk 100, a laser beam is irradiated onto land portion 10A or groove portion 10B in specified locations of the disk surface.

Magnetooptical disk 100 includes recording layer 11 as a phase variable film which is formed through the sputtering process. An ability of recording layer 11 to change in phase between an amorphous phase and a crystallization phase is important to the recording process.

Recording layer 11 is in the amorphous phase immediately after the above formation process. Recording layer 11 may also change from the crystallization phase to the amorphous phase through a heat treatment process.

Information may be recorded in phase variable magnetooptical disk 100 by irradiating disk 100 with a laser beam having sufficient power (e.g. approximately 13 mW) to change the phase of recording layer 11 from the amorphous phase, which is an initialization phase to the crystallization phase.

To erase information recorded in the phase variable magnetooptical disk 100, a laser beam having sufficient power is used to irradiate magnetooptical disk 100. Sufficient power necessary to erase recorded information is approximately 17 mW. During erasure, the phase of recording layer 11 changes from the crystallization phase to the amorphous phase and is maintained in the amorphous phase.

When recording or erasing information in land portion 10A, as illustrated in FIG. 1A, land portion 10A is heated by the irradiation of the laser beam at a specified power P. Subsequently, the phase of recording layer 11 changes from the crystallization phase to the amorphous phase, thereby enabling the recording of information.

In magnetooptical disk 100, the thickness of recording layer 11A of land portion 10A is greater than the thickness of recording layer 11B of groove portion 10B. Moreover, thermal diffusion layer 12A is not formed in the vicinity of recording layer 11A. Thus, the recording power of the laser beam is substantially used for heating recording layer 11A. This allows efficient heating of recording layer 11A with a laser beam of relatively low power that is equal to the recording and erasing power applied to groove portion 10B having a thinner film.

In general, heat is conducted from recording layer 11A in land portion 10A to the adjacent groove portion 10B. However, the heat is generally diffused along a direction of the track by way of thermal diffusion layer 12A in land portion 10A. Consequently, recording layer 11B in groove portion 10B is not heated to a point where an erase process occurs due to the heat from recording layer 11A. This prevents adjacent groove portion 10B from inadvertently being erased.

On the other hand, when recording or erasing information in groove portion 10B, as illustrated in FIG. 1B, groove portion 10B is heated by the irradiation of the laser beam at the same specified power P as land portion 10A. Subsequently, the phase of the crystallization structure of recording layer 11B changes from the amorphous phase to the crystallization phase, thereby recording the information. At this point, because thermal diffusion layer 12A is created in a vicinity of recording layer 11B, heat is diffused along the track direction of magnetooptical disk 100 by way of thermal diffusion layer 12A in land portion 10A. Thermal diffusion is permitted even though the thickness of recording layer 11B is less than recording layer 11A of land portion 10A.

Consequently, recording layer 11A is not heated to a temperature where an erasure process occurs due to the heat from recording layer 11B, thereby preventing adjacent land portion 10A from inadvertently being erased.

According to the first preferred embodiment, recording or erasing of information in recording layer 11B of groove portion 10B may be performed with higher power in comparison with a conventional magnetooptical disk that does not include a thermal diffusion layer. Thus, stable recording and erasing processes with equal recording or erasing power applied to land portions and groove portions may be achieved.

As described above, heat is more readily transferred between recording layer 11B and thermal diffusion layer 12A is compared to heat transfer between recording layer 11B and recording layer 11A. In addition, thermal diffusion layer 12A is created at a closer location to recording layer 11B for thermal conductivity. Thus, an inadvertent erasure (cross erase) does not occur in a land portion adjacent to a groove portion even if there is a difference in film thickness between the recording layers. This achieves both stable recording and erasing processes with a laser beam of equal power and simplifies the configuration and control of the device in comparison with conventional magnetooptical disks in which a deep grade (deep groove) is provided between land and groove portions.

Recording layer 11B and thermal diffusion layer 12A should be, preferably, formed at locations of approximately the same height in the direction of thickness of the magnetooptical disk, thereby assuring that recording layer 11B and thermal diffusion layer 12A can be thermally conductive.

Moreover, it is also acceptable to set the thickness of the film for each of the layers so that a sum tbb of film thickness for thermal diffusion layer 12B in groove 10B and bottom protection layer 2B is approximately the same as the depth h of groove portion 10B. For example, film thickness for a combination of layers 2B and 12B may be set in the range of 50–150% of depth h, thereby assuring that recording layer 11B and thermal diffusion layer 12A can be provided in closer proximity. The second preferred embodiment of the present invention is explained by referring to FIG. 2.

Figure 2A:
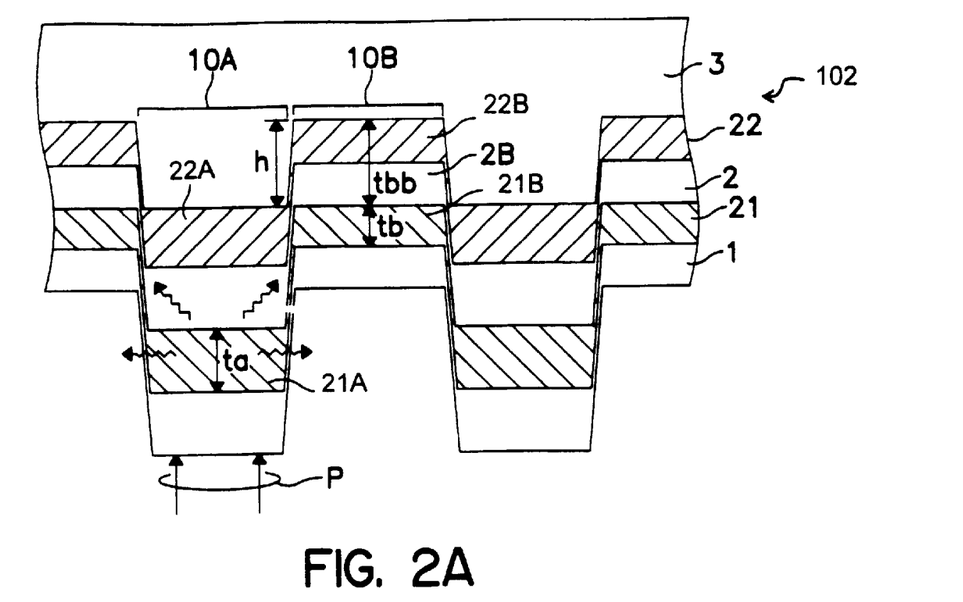
FIGS. 2A and 2B are cross-sectional views of a magnetooptical disk in the form of a photomagnetic disk according to a second preferred embodiment of the present invention.
Figure 2B:
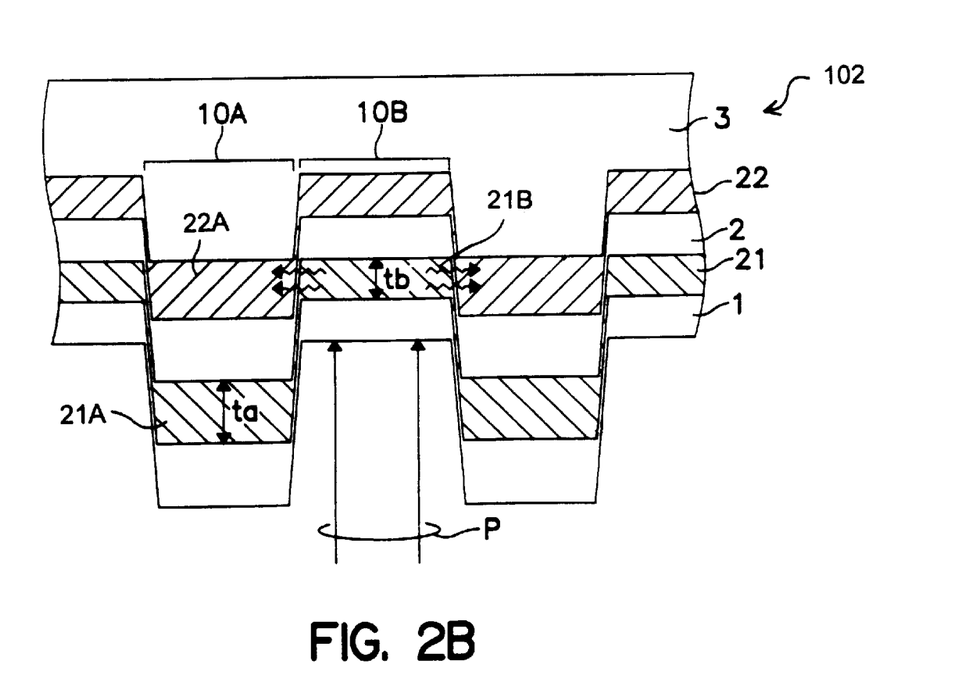

FIGS. 2A and 2B are cross-sectional views of a magnetooptical disk 102 according to the second preferred embodiment of the present invention. In particular, FIG. 2A illustrates magnetooptical disk 102 when recording or erasing information in land portion 10A and FIG. 11B illustrates a state of magnetooptical disk 102 when recording or erasing information in groove portion 10B.

An explanation is provided herein regarding a magnetooptical disk 100 that is capable of recording information in both land and groove portions by using a photomagnetic film in the recording layer.

In FIGS. 2A and 2B, base 3 is a circular base wherein concavities and convexities are provided in either a concentric circle or a spiral shape for the purpose of tracking.

The widths of land portion (convex portion) 10A and groove portion (concave portion) 10B are preferably approximately 0.7 $\mu$m each. In addition, depth h of groove portion 10B, i.e. the difference in the height in the thickness direction of magnetooptical disk 102 at land portion 10A and groove portion 10B is preferably approximately 175 nm (in practice, "h" varies between 80–600 nm).

On top of base 3, a thermal diffusion layer 22 is created by adding an input such as W to Al. At groove portion 10B, thermal diffusion layer 22 maintains a thickness of approximately 100 nm (in practice, layer 22 varies between 10–500 nm). On top of thermal diffusion layer 22, bottom protection layer 2 of ZnS;SiO$_2$ is formed at groove portion 10B and maintains a thickness of approximately 75 nm.

A recording layer 21 is formed on top of bottom protection layer 2. Recording layer 21 includes a vertical magnetization film, such as photomagnetic film TbFeCo, which reaches a vertical magnetization state at a normal temperature. Recording layer 21 is formed groove portion 10B and maintains a thickness of approximately 80 nm (in practice, layer 21 varies between 50–150 nm).

Thermal diffusion layer 22 in land portion 10A and recording layer 21B in groove portion 10B should preferably be formed at locations of approximately the same height in the thickness direction of magnetooptical disk 102.

Furthermore, on top of recording layer 21, a top protection layer 1 is formed at groove portion 10B and maintains a film thickness of approximately 100 nm (in practice, layer 1 varies between 50–150 nm). Top protection layer 1 is preferably made of $ZnS;SiO_2$.

Next, an explanation is provided regarding recording and erasing operations for a magnetooptical disk in the form of a photomagnetic disk according to the second preferred embodiment of the present invention with reference to FIGS. 2A and 2B.

To either record or playback information with regard to photomagnetic disk 102, a laser beam that has a specified erasing power (preferably approximately 9 mW) is irradiated onto land portion 10A or groove portion 10B in specified locations, to thereby heat the locations. During recording or playback, magnetooptical disk 102 is heated from a disk surface side opposite to thermal diffusion layer 22. In addition, a magnetic field is applied in a specified direction on the heated portion to change the direction of the magnetization in recording layer 21 thereby recording, or erasing (initializing), the desired information.

To record information, the laser beam with a specified playback power (approximately 9 mW) is first irradiated onto the surface of magnetooptical disk 102. Subsequently, the temperature in recording layer 21 reaches near the Curie point, thereby enabling the magnetization of recording layer 21 to be reversed by a recording magnetic field (preferably approximately 300 Oe). The information is then recorded in recording layer 21 by applying the recording magnetic field. With reference to FIG. 2A, the upward arrows indicate the recording magnetic field and the stored information is referred to as "information 1".

To erase (i.e. initialize) the information, the laser beam with a specified erasing power (approximately 9 mW) is irradiated onto magnetooptical disk 102. Subsequently, the temperature in recording layer 21 reaches near the Curie point, thereby enabling the magnetization to be reversed by applying the recording magnetic field (approximately 300 Oe). The information in recording layer 21 is then erased (i.e. initialized) by applying the initialization magnetic field in a downward direction in the high temperature section. Initialization information is referred to as "information 0".

To record or erase the information in land portion 10A, as illustrated in FIG. 2A, land portion 10A is heated by the irradiation from a laser beam having the specified power P. Subsequently, the temperature in recording layer 21 reaches near the Curie point, and the information is recorded based on an externally applied magnetic field.

At this point, the thickness of recording layer 21A is greater than recording layer 21B in groove portion 10B because thermal diffusion layer 22 is not formed in the vicinity of recording layer 21A on land portion 10A. In addition, the greater part of the recording power of the laser beam is used for heating recording layer 21A, thereby facilitating use of a laser beam having relatively low power that is equal to the recording and erasing power applied to groove portion 10B (having a thinner film).

The heat is conducted from recording layer 21A in land portion 10A to adjacent groove portion 10B. However, the heat is diffused along the direction of the track by thermal diffusion layer 22A in land portion 10A.

Consequently, recording layer 21B in groove portion 10B is not heated to a point where an erasing process occurs due to heat from recording layer 21A, thereby reducing the possibility of adjacent groove portion 10B from inadvertently being erased.

On the other hand, when recording or erasing the information in groove portion 10B, as illustrated in FIG. 2B, groove portion 10B is heated by irradiation of the laser beam at a specified power P. Subsequently the temperature in recording layer 11B reaches near the Curie point, and the information is recorded according to an externally applied magnetic field.

At this point, as thermal diffusion layer 22A is created in the vicinity of recording layer 21B in groove portion 10B, the heat is diffused along the track direction by way of thermal diffusion layer 22A even though the thickness of recording layer 21B is less than recording layer 21A on land portion 10A.

Consequently, recording layer 21A in land portion 10A is not heated to a point where an erasing process occurs due to heat from recording layer 21B, thereby preventing the adjacent land portion 10A from inadvertently being erased.

Moreover, recording or erasing of information in recording layer 21B in groove portion 10B is achieved with higher power in comparison with a conventional magnetooptical disks that do not include a thermal diffusion layer. This enables a capability for both stable recording and erasing with power that is equal to a recording or erasing power applied to land portion 10A (having a greater film thickness).

Because the heat resistance between recording layer 21B in and thermal diffusion layer 22A is small compared to the heat resistance between recording layer 21B and recording layer 21A, and because a thermal conductivity is greater between layers 21B and 22A, inadvertent erasure (cross erase) does not occur in recording layer 21A even if there is a difference in the film thickness between the recording layers in the land and groove portions. This achieves both stable recording and erasing processes with a laser beam of equal power, as well as simplifying the configuration and control of the device in comparison with conventional magnetooptical disks in which a deep grade (deep groove) is provided between land and groove portions. Recording layer 21B and thermal diffusion layer 22A should be, preferably, formed at locations of approximately the same height in the thickness direction of magnetooptical disk 102, such that recording layer 21B and thermal diffusion layer 22A are more thermally conductive.

Moreover, it is also acceptable to set a film thickness for each layer so that the sum tbb of film thickness for thermal diffusion layer 22B and bottom protection layer 2B is approximately the same as the depth h of groove portion 10B. For example, film thickness may be set in a range of 50–150% of depth h, thereby enhancing thermal conduction between recording layer 21B and thermal diffusion layer 22A.

Figure 3:
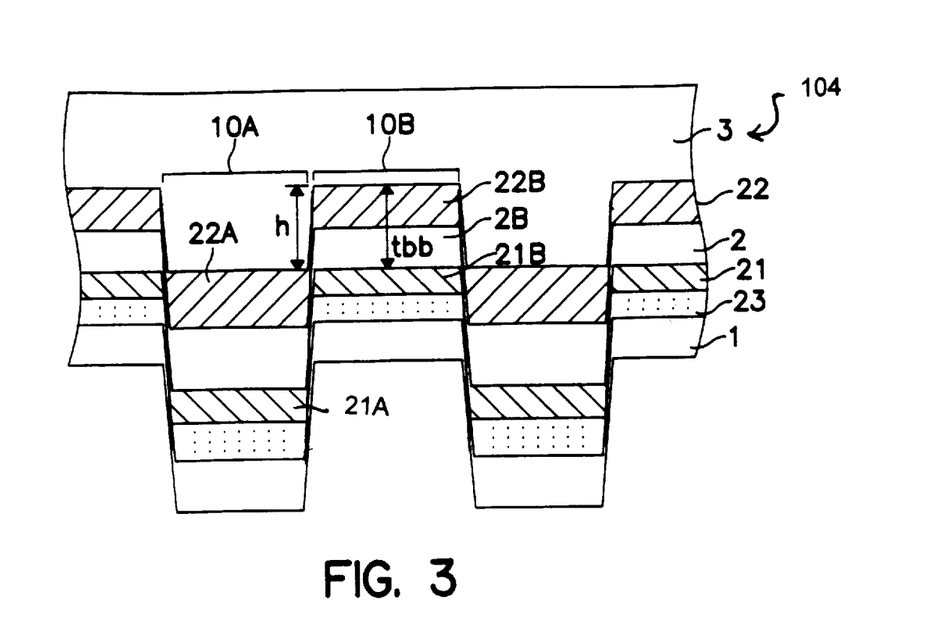
FIG. 3 is a cross-sectional view of a magnetooptical disk in the form of a CAD type photomagnetic disk according to a third preferred embodiment of the present invention.

Next, a third preferred embodiment of the present invention is explained by referring to FIG. 3.

FIG. 3 is a cross-sectional view of a magnetooptical disk 104 according to a third preferred embodiment of the present invention. FIG. 3 is directed to a magnetooptical disk 104 in the form of a CAD type of disk using magnetic super resolution ("MSR").

In FIG. 3, components which are the same as or equivalent to the second preferred embodiment of FIG. 2 are labeled with identical reference numerals.

In this case, in order to record and playback in a high density mode through magnetic super high resolution, playback layer 23 is formed between top protection layer 1 and recording layer 21 (which reaches a vertical magnetization state at normal temperature). Playback layer 23 is formed in groove portion 10B and maintains a film thickness of approximately 30 nm.

Playback layer 23 attains an in-plane magnetization state at normal temperature, and a vertical magnetization state when heated by a laser beam having a power that is greater than the specified playback power (approximately 2–4 mW). The playback power is less than the recording and erasing power (which is approximately 9 mW).

Playback layer 23 is preferably made from a photomagnetic film of GdFeCo, with a percentage of Gd being 26–33 atm %. Moreover, it is preferable that Co have a composition of 5–80 atm % in the FeCo of playback layer 23.

As described above with reference to FIG. 2, the heat resistance between recording layer 21B and thermal diffusion layer 22A in the adjacent land portion 10A is small compared to the heat resistance between recording layer 21B and recording layer 21A. Also, thermal diffusion layer 22A is created at a closer location to recording layer 21A in terms of thermal conductivity.

For example, recording layer 21B and thermal diffusion layer 22A should preferably be formed at a location of approximately the same height in a thickness direction of magnetooptical disk 104.

Subsequently, even if there is a difference in film thickness between the recording layers in the land and groove portions, an inadvertent erasure (cross erase) does not occur in adjacent land portions, thereby achieving both stable recording and erasing processes with a laser beam of equal power. Moreover, the configuration and control of the device is simplified in comparison with conventional devices in which a deep grade (deep groove) is provided between land portions and groove portions.

In comparison with the second preferred embodiment, the third preferred embodiment of FIG. 3 includes playback layer 23. Playback layer 23 attains a vertical magnetization state by way of a laser beam having a recording and erasing power set forth above. The operational processes to record and erase information in recording layer 21 in the third preferred embodiment of the invention of FIG. 3 are identical to those set forth above, and therefore a further explanation is omitted.

Figure 4:
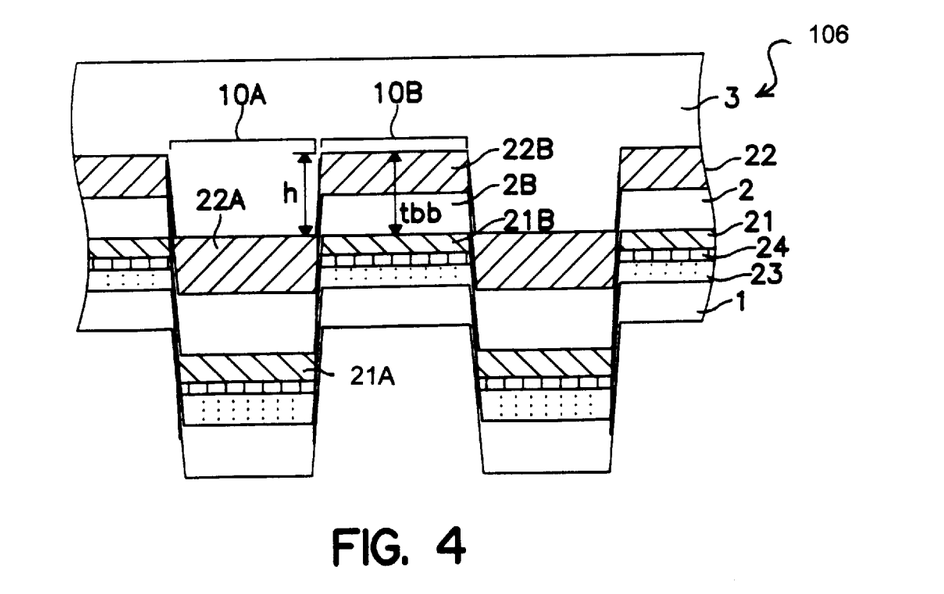
FIG. 4 is a cross-sectional view of a magnetooptical disk in the form of a double mask CAD type photomagnetic disk according to a fourth preferred embodiment of the present invention.

FIG. 4 illustrates a fourth preferred embodiment of the present invention. FIG. 4 is a cross-sectional view of a magnetooptical disk 106. The fourth preferred embodiment is applied to a magnetooptical disk in the form of a double mask type of CAD disk that uses magnetic super resolution ("MSR").

The components of the fourth preferred embodiment (FIG. 4) that are the same or equivalent to the third preferred embodiment (FIG. 3) are labeled with identical codes.

In order to record and playback at a high density through magnetic super high resolution, playback intermediate layer 24 is formed between recording layer 21 and playback layer 23 in groove portion 10B, while maintaining a film thickness of approximately 30 nm.

Intermediate playback layer 24 has an in-plane magnetization state at normal temperature, and a vertical magnetization state when heated by a laser beam having a power that is less than the specified playback power (approximately 2–4 mW). The power of the laser beam is less than the recording and erasing power (approximately 9 mW), and the magnetization dissipated state as the temperature increases further to reach the Curie point.

At this time, the Curie temperature in playback intermediate playback layer 24 must be higher than the temperature by which playback layer 23 changes from the in-plane magnetization state to the vertical magnetization state.

When a photomagnetic film including TbFe is used as playback intermediate layer 24, a preferable composition of Tb is 19 atm %–25 atm % in order to fulfill the above noted requirements.

As described above with reference to FIGS. 2 and 3, the heat resistance between recording layer 21B and thermal diffusion layer 22A is small compared to the heat resistance between recording layer 21B and recording layer 21A. Accordingly, thermal diffusion layer 22A is close to recording layer 21B to enhance thermal conductivity. For example, recording layer 21B and thermal diffusion layer 22A should, preferably, be formed at a location of approximately a same height in a thickness direction of magnetooptical disk 106.

Subsequently, even if there is a difference in film thickness between the recording layers in the land and groove portions, the possibility of inadvertent erasure (cross erase) in an adjacent land portion is significantly reduced, thereby achieving both stable recording and erasing processes with a laser beam of equal power. Moreover, configuration and control of the device is simplified in comparison with conventional methods, in which a deep grade (deep groove) is provided between land portions and groove portions.

In comparison with the third preferred embodiment set forth above with reference to FIG. 3, playback layer 24 attains a vertical magnetization state by use of a recording and erasing power having an operational processes which is identical to the third preferred embodiment. Further explanation is therefore omitted.

Figure 5:
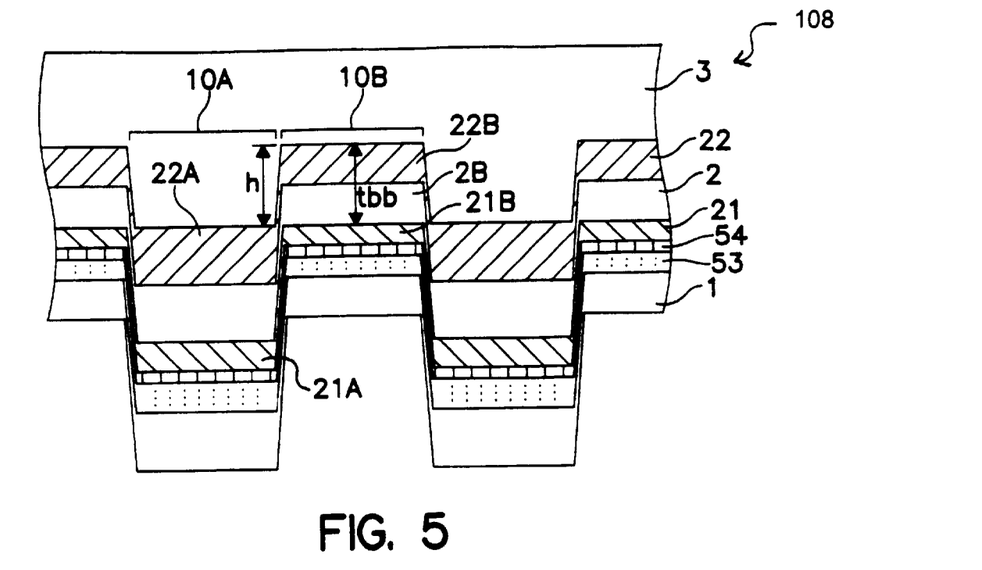
FIG. 5 is a cross-sectional view of a magnetooptical disk in the form of a double mask type photomagnetic disk according to a fifth preferred embodiment of the present invention.

FIG. 5 illustrates a fifth preferred embodiment of the present invention. FIG. 5 is a cross-sectional view of a magnetooptical disk 108 according to the fifth preferred embodiment of the present invention. The fifth preferred embodiment is applied to a double mask type of CAD disk that uses magnetic super resolution ("MSR").

In FIG. 5, the components that are same or equivalent to, the second preferred embodiment (FIG. 2) are labeled with identical codes.

In order to record and playback at high density with magnetic super high resolution, a playback intermediate layer 54 is formed on top of recording layer 21 in groove portion 10B. Playback intermediate layer 54 maintains a film thickness of approximately 50 nm. Playback layer 53 is formed between playback intermediate layer 54 and bottom protection layer 2 in groove portion 10B, and maintains a film thickness of approximately 30 nm.

Playback layer 53 maintains a vertical magnetization state at normal temperature and also when a laser beam of playback power (approximately 2–4 mW) is applied. Playback intermediate layer 54 has an in-plane magnetization state at normal temperature, and a vertical magnetization state when the temperature increases through irradiation by a laser beam of playback power. Playback intermediate layer 54 attains a magnetization dissipated state as the temperature increases further to reach the Curie point.

When a photomagnetic film of GdFeCo is used as playback layer 53, the Gd preferably has a composition of 24–26 atm %. The Co preferably has a composition of 5–80 atm % in the FeCo of the photomagnetic film.

Furthermore, when a photomagnetic film including GdFe is used as playback intermediate layer 54, the Gd preferably has a composition of 26–33 atm %.

As described above with reference to FIG. 2, when the heat resistance between recording layer 21B and thermal diffusion layer 22A is small compared to the heat resistance between recording layer 21B and recording layer 21A, thermal conductivity between 22A and 21B is increased. For example, recording layer 21B and thermal diffusion layer 22A should preferably be formed at a location of approximately the same height in a thickness direction of magnetooptical disk 108.

Subsequently, even if there is a difference in film thickness between the recording layers in the land and groove portions, the possibility for inadvertent erasure (cross erase) is reduced in the adjacent land portion, thereby achieving both stable recording and erasing processes with a laser beam of equal power. Moreover, configuration and control of a device in comparison with conventional devices having a deep grade (deep groove) between land and groove portions is simplified.

The fifth preferred embodiment of FIG. 5 includes playback layer 53 and playback intermediate layer 54. Playback layer 53 and playback intermediate layer 54 attain a vertical magnetization state by using both the recording and erasing power. The operational processes to record and erase the information in recording layer 21 is identical with the second preferred embodiment of FIG. 2 and therefore further explanation is suitably omitted.

In the above third through fifth embodiments, thermal diffusion layer 22A is formed such that the heat resistance between recording layer 21B in groove portion 10B and thermal diffusion layer 22A in adjacent land portion 10A is small compared to the heat resistance between recording layer 21B and recording layer 21A. The thermal diffusion layer 22A is also created at a closer location to recording layer 21B in terms of thermal conductivity.

In the above third through fifth embodiments, the thickness of the film for each layer may be set in such a manner that the sum tbb of the film thickness for thermal diffusion layer 22B and the film thickness of bottom protection layer 2B becomes approximately the same as depth h of groove portion 10B. For example, the sum tbb of film thickness should be in the range of 50–150% of depth h, thereby providing thermal conduction between recording layer 21B and thermal diffusion layer 22A.

Figure 6:
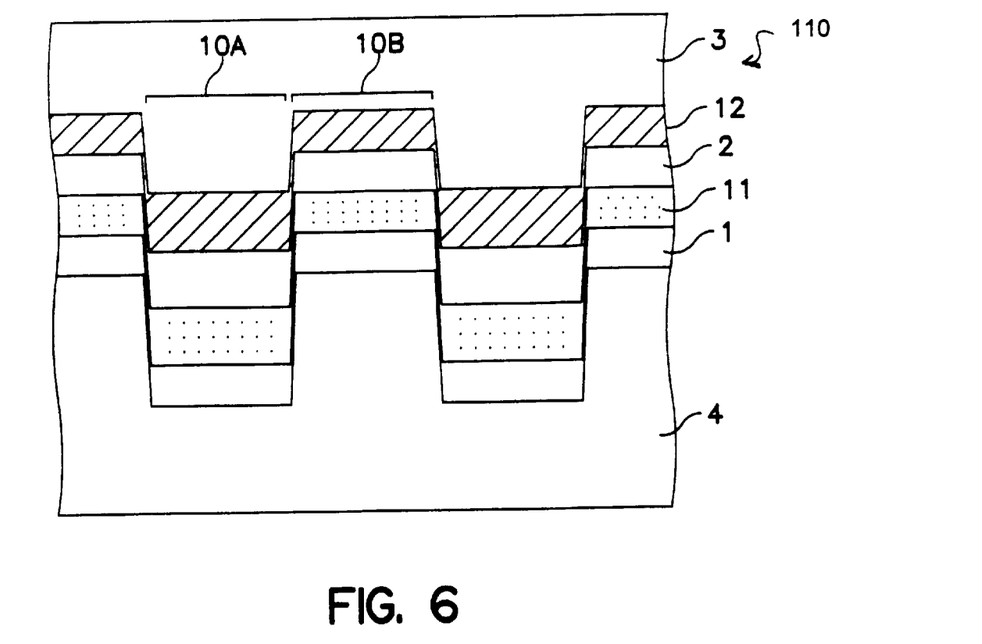
FIG. 6 is a cross-sectional view of a magnetooptical disk in the form of a phase variable magnetooptical disk according to a sixth preferred embodiment of the present invention.

FIG. 6 illustrates a sixth preferred embodiment of the present invention. FIG. 6 is a cross-sectional view of magnetooptical disk 110 having a circular, transparent base 4 of approximately 1 mm in thickness and preferably of glass, i.e. $Al_2O_3$ (alumina) or $SiO_2$, etc. Magnetooptical disk 110 exhibits a permeability at the wavelength of the laser beam used, and may be adhered onto a surface of top protection layer 1.

FIG. 6 illustrates an example of a magnetooptical disk 110 which is a phase variable disk similar to the first embodiment of FIG. 1. However, the present invention is not limited to this application and it may also be applied to each magnetooptical disk (photomagnetic disk) of the second through fifth embodiments as well.

Each magnetooptical disk of the present invention as set forth above by way of the first through sixth embodiments may be recorded or played back on a conventional magnetooptical disk playback apparatus.

Next, an explanation is provided regarding a method of constructing a magnetooptical disk of the aforementioned first through fifth embodiments as examples of the present invention.

For constructing a magnetooptical disk of the phase variable type according to the first embodiment of FIG. 1, a thermal diffusion layer 12 made preferably from Al:W is formed on base 3 through an RF magnetron sputtering process. Base 3 has a land portion (convex portion) 10A and a groove portion (concave portion) 10B in a concentric circle, or a spiral shape, for the purpose of tracking with approximately a 175 nm height difference, in order to maintain a film thickness of approximately 100 nm in groove portion 10B.

At this time, using a target in which W is added to Al, gas pressure in a chamber of a sputtering system is exhausted to below $1\times10^{-6}$ Torr. Next, Ar gas is introduced to increase the gas pressure in the chamber to $5\times10^{-3}$ Torr in order to execute the sputtering process.

Bottom protection layer 2 is preferably formed from $ZnS;SiO_2$ to achieve approximately 75 nm in thickness in groove portion 10B.

At this time, using $ZnS;SiO_2$ as a target, the gas pressure in the chamber of the sputtering system is exhausted to below $1\times10^{-6}$ Torr. Next, Ar gas is introduced to increase the gas pressure in the chamber to $5\times10^{-3}$ Torr.

A recording layer 11 preferably of $Ge_2Sb_2Te_5$ is likewise formed on top of bottom protection layer 2 through the RF magnetron sputtering process to achieve approximately 80 nm in thickness. At this time, $Ge_2Sb_2Te_5$ is used as a target with other conditions in the sputtering system being the same as those as when $ZnS;SiO_2$ is used.

On top of recording layer 11, a layer of $ZnS;SiO_2$ is further formed as a top protection layer 1 in the same process used for production of bottom protection layer 2. Top protection layer 11 has a thickness of approximately 100 nm in groove portion 10B.

To construct a magnetooptical disk (phase variable disk) according to the second preferred embodiment of FIG. 2, a thermal diffusion layer 22 of Al:W is formed through an RF magnetron sputtering process. Land portion (convex portion) 10A and groove portion (concave portion) 10B are formed on base 3 in a concentric circle, or a spiral shape, for the purpose of tracking with approximately 175 nm of height difference in order to maintain a film thickness of approximately 100 nm in groove portion 10B.

At this time, by a target in which W is added to Al, the gas pressure in the chamber of the sputtering system is exhausted to below to $1\times10^{-6}$ Torr. Then, Ar gas is introduced into the chamber to increase the gas pressure to $5\times10^{-3}$ Torr in order to execute the sputtering process.

Bottom protection layer 2 is preferably formed of $ZnS;SiO_2$ and is approximately 75 nm in thickness in groove portion 10B.

At this time, by using an Si target, the gas pressure in the chamber of the sputtering system is exhausted to below $1\times10^{-6}$ Torr. Next, a mixed gas of Ar and $N_2$ is introduced into the chamber to increase the gas pressure in the chamber to $5\times10^{-3}$ Torr in order to execute the sputtering process.

Next, a photomagnetic layer of $Ge_2Sb_2Te_5$ (to be vertically magnetized) in the form of recording layer 21 is formed on top of bottom protection layer 2. The photomagnetic layer is approximately 100 nm in thickness in groove portion 10B.

Here, by using Th, Fe, and Co as targets, the Ar gas is introduced to achieve a gas pressure of $5\times10^{-3}$ Torr in the chamber to perform the sputtering process.

The composition of TbFeCo that is achieved at this time is Tb:21 atm %, Fe:63.2 atm %, and Co:15.8 atm %.

Top protection layer 1 of SiN is further formed on top of recording layer 21 through the RF magnetron sputtering process to achieve a film thickness of approximately 70 nm in groove 10B.

At this time, by using a Si target, the gas pressure in the chamber of the sputtering system is exhausted to below $1\times10^{-6}$ Torr. Next, a mixed gas of Ar and $N_2$ is introduced into the chamber to increase the gas pressure in the chamber to $5\times10^{-3}$ Torr in order to execute the sputtering process.

For constructing a phase variable magnetooptical disk according to the third preferred embodiment of FIG. 3, a photomagnetic film of GdFeCo that exhibits the in-plane magnetization state at normal temperature is formed as playback layer 23. Playback layer 23 is formed on top of recording layer 21 in order to achieve a film thickness of approximately 50 nm in groove portion 10B.

Here, using Gd, Fe, and Co as targets, Ar gas is introduced to achieve a gas pressure of $5\times10^{-3}$ Torr in the chamber to perform the sputtering process.

The composition of GdFeCo that is achieved at this time is Gd:29 atm %, Fe:56.8 atm %, and Co:14.2 atm %. However, the present invention is not limited to this composition and it is acceptable to deviate from the above as long as the film maintains the in-plane magnetization state at normal temperature and becomes a vertical magnetization state when the playback power is irradiated.

Top protection layer 1 is next formed on playback layer 23 according to a similar method with that used for the second preferred embodiment. The recording layer is next formed at this time to achieve a film thickness of approximately 50 nm in groove portion 10B.

For constructing a magnetooptical disk of the phase variable type according to the fourth preferred embodiment of FIG. 4, a magnetic film of TbFe is formed as playback layer 23 on recording layer 21. Playback layer 23 exhibits a vertical magnetization state at a normal temperature but looses magnetization when the temperature increases to reach the Curie point. Playback layer 23 is formed through the above construction method in the third preferred embodiment to achieve a film thickness of approximately 30 nm in groove portion 10B.

Here, using Th and Fe as targets, Ar gas is introduced into the chamber to achieve a gas pressure of $5\times10^{-3}$ Torr to execute the co-sputtering process. The composition of TbFeCo that is achieved at this time is Tb:21 atm % and Fe:79 atm %.

Playback layer 23 and top protection layer 1 are also formed according to similar methods used for the third preferred embodiment.

Furthermore, for constructing a magnetooptical disk of the phase variable type according to the fifth preferred embodiment of FIG. 5, a photomagnetic film of GdFe, etc. is formed as recording layer 21. The photomagnetic film exhibits the in-plane magnetization state at normal temperature and changes to the vertical magnetization state when the temperature increases above a certain point as the playback laser beam is irradiated. However, the photomagnetic film looses magnetization when the temperature further increases above another certain point. Playback layer 23 is formed on top of recording layer 21 through the magnetooptical disk construction method used for the second preferred embodiment in order to achieve a film thickness of approximately 50 nm in groove portion 10B.

Here, using Gd and Fe as targets, Ar gas is introduced to achieve a gas pressure of $5\times10^{-3}$ Torr in the chamber to perform the sputtering process.

The composition of GdFeCo that is achieved at this time is Gd:29 atm % and Fe:71 atm %. However, the present invention is not so limited. Other compositions are acceptable as long as the film maintains the in-plane magnetization state at a low temperature area and changes to the vertical magnetization state at a higher temperature area (medium temperature area), but looses magnetization as the temperature reaches the Curie point for the higher temperature area.

On top of playback layer 54, a photomagnetic playback layer 53 is constituted of GdFeCo and that exhibits the vertical magnetization state both at a normal temperature and when the laser beam is irradiated, is formed. A film thickness of approximately 50 nm is formed in groove portion 10B.

Here, using Gd, Fe, and Co as targets, the Ar gas is introduced to achieve the gas pressure of $5\times10^{-3}$ Torr in the chamber to perform the co-sputtering process.

The composition of GdFeCo that is achieved at this time is Gd:25 atm % and Fe:60 atm %, and Co:15 atm. However, the present invention is not so limited. It is acceptable to vary the composition as long as the film maintains the vertical magnetization state both at a normal temperature and when the laser beam of the playback power is irradiated.

Top protection layer 1 is formed according to a similar method as that used in accordance with the first preferred embodiment of the present invention. In this case, recording layer 21 is formed with a film thickness of approximately 50 nm in groove portion 10B.

As described above, the present invention is designed in such a manner that the thermal diffusion layer to diffuse the heat generated by the irradiation of the laser beam is formed on a base that has convex and concave portions in a concentric circle, or a spiral shape, for the purpose of tracking. A protection layer is formed over the thermal diffusion layer, and a recording layer to record various bits of information is formed on top of the protective layer. Therefore, a thermal diffusion layer of a convex portion is formed in the vicinity of the recording layer, of which the film thickness is relatively thin. The thermal diffusion layer is located in a higher location than the thermal diffusion layer in the concave portion, but the thermal diffusion layer of the concave portion is not formed near the recording layer, of which the film thickness is relatively thick, in the convex portion. Thus, even if there is a difference in film thickness between the recording layers in land and groove portions, an inadvertent erasure (cross erase) does not occur in adjacent convex portion. This achieves both stable recording and erasing processes with a laser beam of equal power. Moreover, the configuration and control of the device is simplified in comparison with conventional methods in which a deep grade (deep groove) is provided between land portions and groove portions.

Moreover, the present invention is configured in one of the following manners. In the vicinity of the recording layer in the concave portion, a thermal diffusion layer is formed in a convex portion that is adjacent to the concave portion. The recording layer of the concave portion and the thermal diffusion layer of the convex portion are then formed at approximately the same height in a thickness direction of disk. Alternatively, the sum of the film thickness for the thermal diffusion layer and protective layer in the concave portion is 50–150% of the depth of the base in the concave portion.

Consequently, the thermal diffusion layer of the convex portion that is formed in the vicinity of the recording layer of the concave portion assures the discharge of the heat generated in the recording layer in the concave portion.

Because the transparent base exhibits permeability at a wavelength of the laser beam used for both the recording and playback processes, and because the transparent base is adhered to the surface of the disk on the opposite side from the base, the laser beam may be irradiated from the opposite side of the thermal diffusion layer through the transparent base. Thus, each magnetooptical disk of the present invention may be recorded and played back on a conventional magnetooptical disk playback apparatus.

Moreover, as the thermal diffusion layer is constituted of a metal film has a thickness of 10–100 nm, heat is efficiently diffused through the thermal diffusion layer.

Furthermore, as the recording layer is constituted of a phase variable film, of which the reflectance power varies depending on the conditions of crystallization, even if there is a difference in the film thickness between the recording layers in the convex and concave portions, inadvertent erasure (cross erase) does not occur in the adjacent convex portion even with the phase variable disks. This achieves both stable recording and erasing processes with a laser beam of equal power as well as simplifying the configuration and control of the device.

Moreover, the recording layer is constructed of a photomagnetic layer such that a direction of magnetization changes due to a magnetic field that is applied from outside when the recording layer is heated by the irradiation of the recording laser beam. A playback layer, which maintains an in-plane magnetic state at a normal temperature but changes to a vertical magnetization state when heated by the irradiation of the playback laser beam is also formed.

A playback intermediate layer is also formed which maintains a vertical magnetization state at a normal temperature but changes to a magnetization dissipated state when heated by irradiation of a playback laser beam. The playback intermediate layer is formed between the playback layer and the recording layer. Additionally, a playback intermediate layer is formed of the recording layer which maintains the vertical magnetization state at a normal temperature and when heated by the irradiation of the playback laser beam. The playback intermediate layer is formed between both the playback layer and the recording layer, and maintains the in-plane magnetization state at normal temperature, but changes to the vertical magnetization state when heated by the irradiation of the laser beam. The playback intermediate layer then becomes the magnetization dissipated state at an even higher temperature.

As a result, even if there is a difference in the film thickness between the recording layers in the convex and concave portions, an inadvertent erasure (cross erase) does not occur in the adjacent convex portion even with phase variable disks. This achieves both stable recording and erasing processes with a laser beam of equal power as well as simplifying the configuration and control of the device.

Moreover, the present invention is a magnetooptical disk that includes both the convex and concave portions formed in a concentric circle, or a spiral shape, for the purpose of tracking. A recording layer is formed in a concave portion to record information. The recording layer is also formed on a convex portion to record information. A thermal diffusion layer that is a convex portion is formed in the vicinity of the recording layer in the concave portion, located adjacent to the convex portion, in order to diffuse heat generated by the recording layer with the concave portion.

Subsequently, the heat that has been generated in the recording layer in the concave portion is discharged through the thermal diffusion layer in the adjacent convex portion. Thus, even if there is a difference in film thickness between the recording layers in the convex and concave portions, an inadvertent erasure (cross erase) does not occur in the adjacent convex portion. This achieves both stable recording and erasing processes with a laser beam of equal power as well as simplifying the configuration and control of the device in comparison with conventional methods in which a deep grade (deep groove) is provided between the convex portion and the concave portion.

Although a few preferred embodiments of the present invention have been illustrated and described, it will be appreciated by those skilled in the art that changes may be made in these embodiments without departing from the principles and spirit of the invention, the scope of which is defined in the claims and their equivalents.

What is claimed is:

1. A magnetooptical disk, comprising:
   a base;
   a thermal diffusion layer formed on said base having both convex and concave portions arranged in a concentric circle or a spiral shape for tracking, said thermal diffusion layer to diffuse heat generated through irradiation by a laser beam;
   a protective layer formed on said thermal diffusion layer; and
   a recording layer formed over said protective layer to record information.

2. The magnetooptical disk according to claim 1, wherein said thermal diffusion layer is formed on the convex portions in a location adjacent to a formation location of said recording layer formed on the concave portions, along a tracking direction of the magnetooptical disk.

3. The magnetooptical disk according to claim 1, wherein said recording layer on the concave portions and said thermal diffusion layer on the convex portions are formed in approximately the same height in a thickness direction of the magnetooptical disk.

4. The magnetooptical disk according to claim 1, wherein the sum of film thickness for said thermal diffusion layer and said protective layer in the concave portions is between 50–150% of the depth of said base in the concave portions.

5. The magnetooptical disk according to claim 1, further comprising:
   a top protection layer adhered to the magnetooptical disk opposite from said base, wherein said top protection layer is permeable to the a laser beam.

6. The magnetooptical disk according to claim 1, wherein said recording layer is a metal film.

7. The magnetooptical disk according to claim 1, wherein film thickness of said thermal diffusion layer is between 10–100 nm.

8. The magnetooptical disk according to claim 1, wherein said recording layer is a phase variable film having a reflectance power which varies depending on conditions of crystallization.

9. The magnetooptical disk according to claim 1, wherein said recording layer includes a photomagnetic layer, the photomagnetic layer having a direction of magnetization which changes due to an externally applied magnetic field when said recording layer is heated by the irradiation of the laser beam.

10. The magnetooptical disk according to claim 9, further comprising:
    a playback layer formed between said protective layer and said recording layer to maintain an in-plane magnetization state at normal temperature and a vertical magnetization state when heated by irradiation of the laser beam.

11. The magnetooptical disk according to claim 10, further comprising:
a playback intermediate layer formed between said playback layer and said recording layer to maintain a vertical magnetization state at normal temperature and a magnetization dissipated state when heated by the irradiation of the laser beam.

12. The magnetooptical disk according to claim 9, further comprising:
a playback layer formed over said recording layer to maintain a vertical magnetization state at a normal temperature and when heated by irradiation of the laser beam; and
a play back intermediate layer formed between said playback layer and said recording layer, to maintain an in-plane magnetization state at normal temperature, a vertical magnetization state when heated by the irradiation of the laser beam, and a magnetization dissipated state at a predetermined temperature higher than the temperature for conversion into the vertical magnetization state.

13. The magnetooptical disk according to claim 1,
wherein said recording layer is formed over convex portions and concave portions, and
a thickness of said recording layer formed over the convex portions is greater than a thickness of said recording layer formed over the concave portions.

14. The magnetooptical disk according to claim 1,
wherein a depth of the concave portions is within a 80–600 nm range of the convex portions.

15. The magnetooptical disk according to claim 1,
wherein a thermal conductivity coefficiency of said thermal diffusion layer is greater than a thermal conductivity coefficiency of said recording layer.

16. The magnetooptical disk according to claim 1,
wherein a thermal conductivity coefficiency of said thermal diffusion layer is greater than a thermal conductivity coefficiency of said protective layer.

17. The magnetooptical disk according to claim 1,
wherein a thermal conductivity coefficiency of said thermal diffusion layer is approximately 10 times higher than the thermal conductivity coefficiency of said protective layer.

18. An optical disk, comprising:
a base;
a function layer formed on said base having both convex and concave portions configured in a concentric circle or a spiral shape;
a protective layer formed over said function layer; and
a recording layer formed over said protective layer,
wherein a thermal conductivity of said function layer, said protective layer, and said recording layer respectively increase in an order of said function layer, said protective layer, and said recording layer.

19. The optical disk according to claim 18,
wherein a depth of the concave portions is within a 80–600 nm range of the concave portions.

20. The magnetooptical disk according to claim 1, wherein said recording layer follows contours of the convex and concave portions of said thermal diffusion layer such that the portion of said recording layer following the concave portion contour is adjacent to the portion of said thermal diffusion layer following the convex portion contour in a radial direction of said magnetooptical disk to transfer heat.

21. An optical disk, comprising:
a base having both land and groove portions arranged in a concentric circle or a spiral shape for tracking;
a thermal diffusion layer formed on said base and following contours of the land and groove portions, said thermal diffusion layer to diffuse heat generated through irradiation by a laser beam; and
a recording layer formed over said thermal diffusion layer and following the contours of the land and groove portions to record information,
wherein the portion of said recording layer following the groove portion contour is adjacent to the portion of said thermal diffusion layer following the land portion contour in a radial direction of said optical disk to transfer heat.

22. The optical disk according to claim 21, wherein the portion of said recording layer following the groove portion contour is thinner than the portion of said recording layer following the land portion contour.

* * * * *